Oct. 9, 1945.  S. B. WILLIAMS  2,386,377
ARC DECREASING CIRCUIT
Filed Sept. 30, 1942  2 Sheets-Sheet 1
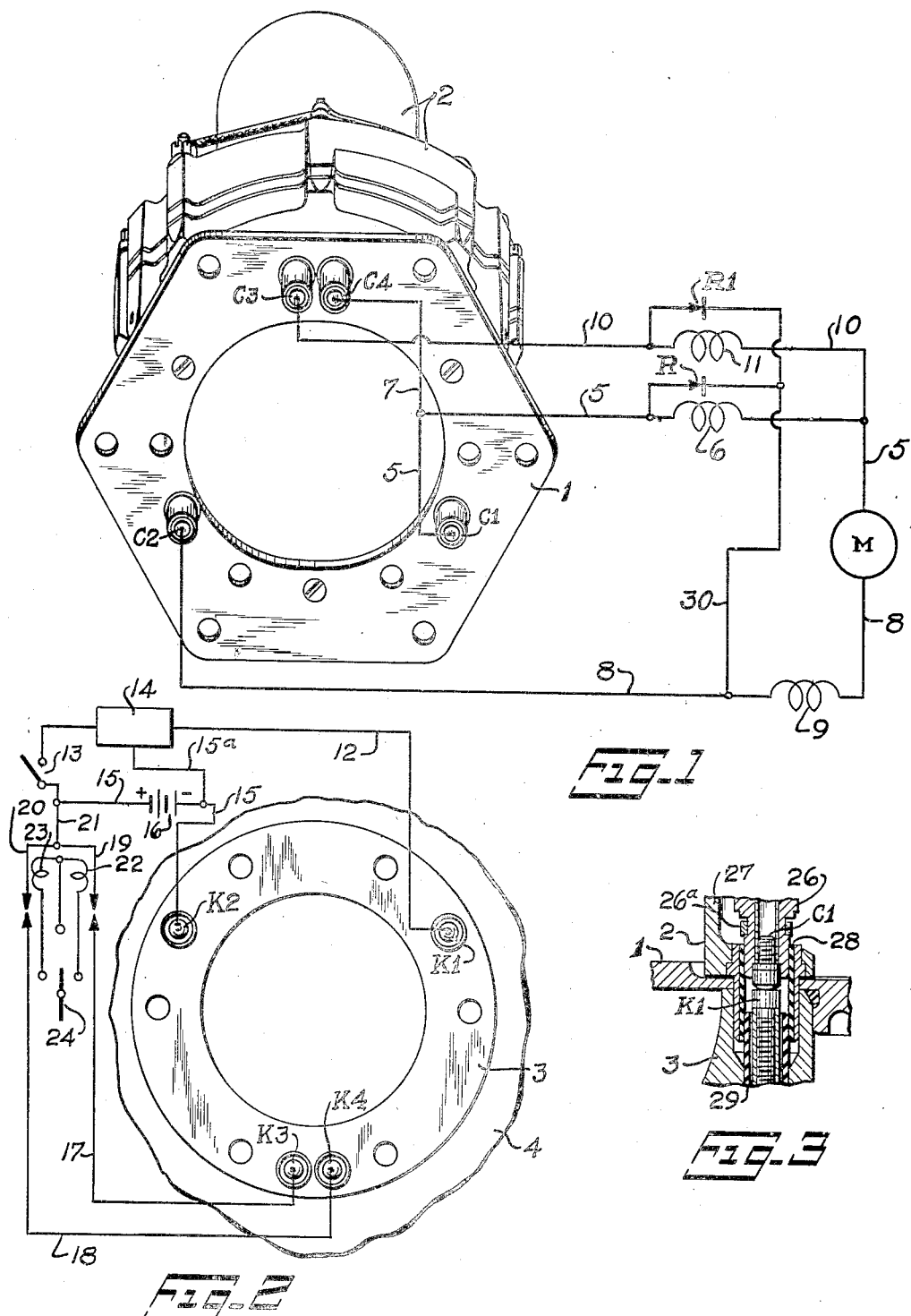
INVENTOR.
SIDNEY B. WILLIAMS.
BY
ATTORNEY

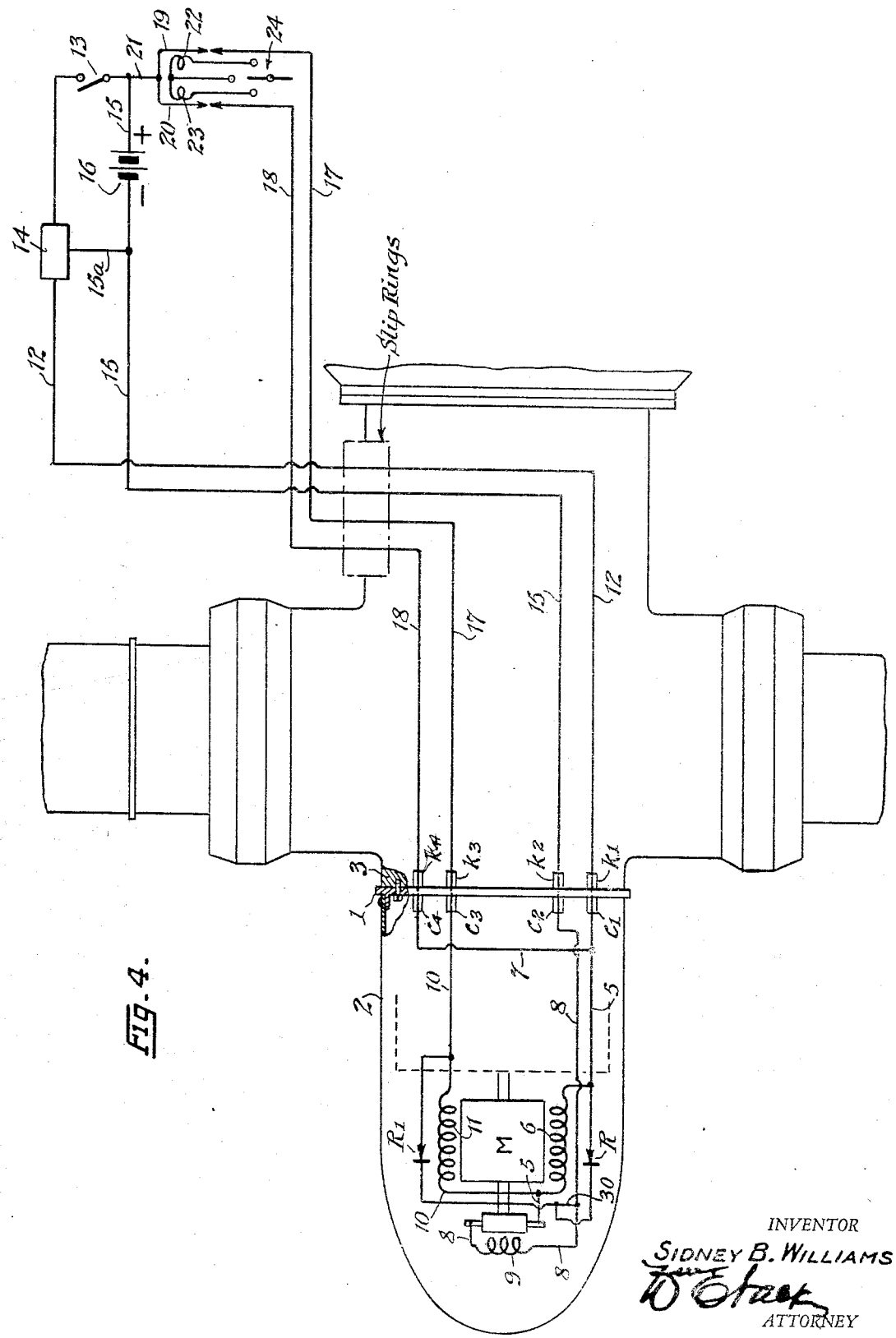

Patented Oct. 9, 1945

2,386,377

UNITED STATES PATENT OFFICE 2,386,377

ARC DECREASING CIRCUIT

Sidney B. Williams, West Caldwell, N. J., assignor to Curtiss-Wright Corporation, a corporation of Delaware Application September 30, 1942, Serial No. 460,307

2 Claims. (Cl. 170—163)

My invention relates to a circuit arrangement for decreasing the arcing effect at a pair of switch contact members when the flow of electrical current therethrough is interrupted.

More particularly, my invention relates to a system including an electrical motor and an energizing source of electrical current, relatively movable switch contact members being provided for interrupting the flow of current to said motor, the system including means, such as a rectifier, connected across a winding of the motor for decreasing the arcing effect at said contact members when one of them is separated from the other to open the circuit of said motor.

Various other objects, advantages and features of my invention will become apparent from the following detailed description.

My invention resides in the circuit arrangement, arc-decreasing means, features and arrangements of the character hereinafter described and claimed.

For an understanding of my invention and for an illustration of one of the forms thereof, reference is to be had to the accompanying drawings, in which:

Figs. 1 and 2 are diagrammatic views illustrating the invention; and

Fig. 3 is a sectional view showing a limit switch arrangement.

Referring to Figs. 1 and 2, I have diagrammatically illustrated parts of a power unit and power gear assembly for controlling the pitch of an airplane propeller as manufactured by Curtiss-Wright Corporation. In Fig. 1, I have shown the adapter plate 1 which is disposed at one end of the housing 2 and, in Fig. 2, I have shown the flange 3 of the propeller hub 4, the adapter plate 1 and the flange 3 being adapted to be suitably secured together to form a unitary assembly.

The housing 2 contains the motor which, either automatically or under manual control, operates to change the pitch of the associated propeller, the operating circuits of this motor being enclosed by said housing and terminating in the contact members $c1$, $c2$, $c3$ and $c4$, the contact members $c1$, $c3$ and $c4$ being movable as hereinafter described.

This arrangement has been diagrammatically illustrated in Fig. 1 wherein the contact member $c1$ is shown as having connected thereto a conductor 5 which extends to one terminal of the motor M and includes one of the motor field windings 6. Branching from the conductor 5, between the contact member $c1$ and the field winding 6, is a conductor 7 which extends to the contact member $c4$. The contact member $c2$ has connected thereto a conductor 8 which extends to the other terminal of said motor M, the conductor 8 including a coil 9 which serves as an electro-magnetic winding for releasing a spring-actuated brake simultaneously as the motor M is energized. The contact member $c3$ has connected thereto a conductor 10 which leads to the aforesaid conductor 5, said conductor 10 including the other motor field winding 11.

The hub carries the fixed contact members $k1$, $k2$, $k3$ and $k4$ with which the aforesaid contact members $c1$, $c2$, $c3$ and $c4$ are coactable respectively. These fixed contact members of the hub 4 have conductors connected thereto, respectively, these conductors being carried by said hub 4 and leading to sources of electrical current, sets of relay contact members and a switch all disposed exteriorly of said assembly.

This arrangement has been diagrammatically illustrated in Fig. 2 wherein the contact member $k1$ is shown as having connected thereto a conductor 12 which leads to one terminal of a manually operable switch 13, said conductor 12 including a booster motor-generator or dynamotor 14 hereinafter termed a "booster motor." The contact member $k2$ has connected thereto a conductor 15 which leads to the other terminal of the aforesaid manually operable switch 13, said conductor 15 including a battery 16. Broaching from the conductor 15 between the contact member $k2$ and the battery 16 is a conductor $15a$ which leads to the booster motor 14. The contact members $k3$ and $k4$ have connected thereto the respective conductors 17 and 18 which terminate, respectively, in fixed contacts with which are coactable movable contacts forming, respectively, the terminals of conductors 19 and 20 which have connected thereto a conductor 21 which leads to and is connected to the aforesaid conductor 15 between the switch 13 and the battery 16.

The movable contacts and the associated conductors 19 and 20 constitute a pivoted structure which may be actuated to swing in a clockwise direction, in response to energization of a relay winding 22 to connect the conductors 17 and 19 together, or in a counter-clockwise direction, in response to energization of a relay winding 23, to connect the conductors 18 and 20 together. Energization of these windings is effected individually by an automatically controlled switch 24.

When the adapter plate 1 and the hub 4 have been connected together to form the unitary assembly described above, the movable contact members $c1$, $c2$, $c3$ and $c4$ coact, in circuit-forming relation, with the respective contact members $k1$, $k2$, $k3$ and $k4$.

When the airplane carrying the disclosed power unit and power gear assembly is in flight and the speed of the airplane engine changes in such manner that the pitch of the airplane propeller should be increased, the relay winding 23 is energized to cause the contact at the end of the conductor 20 to engage the adjacent contact at the end of the conductor 18. When this happens, a circuit is completed as follows: From the negative terminal of the battery 16 by way of conductor 15, contact members $k2$ and $c2$, conductor 8 including the coil 9, the motor M, conductor 5 including the winding 6, conductor 7, contact members $c4$ and $k4$, conductor 18, conductor 20, conductor 21, and thence back to the positive terminal of said battery 16 by way of the conductor 15. Closure of this circuit effects operation of the motor M in such direction that the pitch of the airplane propeller increases.

In the event that the speed of the airplane engine changes in such a manner that the pitch of the airplane propeller should be decreased, the relay winding 22 is energized to cause the contact at the end of the conductor 19 to engage the adjacent contact at the end of the conductor 17. When this happens, a circuit is completed as follows: From the negative terminal of the battery 16 by way of the conductor 15, contact members $k2$ and $c2$, conductor 8 including the coil 9, the motor M, conductor 5, conductor 10 including the winding 11, contact members $c3$ and $k3$, conductor 17, conductor 19, conductor 21, and thence back to the positive terminal of the battery 16 by way of the conductor 15. Closure of this circuit effects operation of the motor M in such direction that the pitch of the airplane propeller is decreased.

In the event that the operation of the airplane engine is discontinued during flight and, if the airplane propeller is to be moved to feather position, the pilot closes the switch 13 to thereby close a local circuit through the booster motor 14 and the battery 16. As a result the booster motor 14 supplies current over a circuit as follows: From one output terminal of said booster motor 14 by way of the conductor 15a, conductor 15, contact members $k2$ and $c2$, conductor 8 including the coil 9, the motor M, conductor 5 including the winding 6, contact members $c1$, and $k1$, and thence back to the other output terminal of said booster motor 14 by way of the conductor 12.

In view of the foregoing description, it will be understood that the contact members $c2$, $k2$ remain closed at all times. The other sets of contact members constitute limit switches in the respective feather, low pitch and high pitch circuits of the assembly herein described. That is, the contact member $c1$ moves from the associated contact member $k1$ when the airplane propeller has moved to maximum extent in feather position; the contact member $c3$ moves from the associated contact member $k3$ when the airplane propeller has moved to maximum extent in low pitch position; and the contact member $c4$ moves from the associated contact member $k4$ when the airplane propeller has moved to maximum extent in high pitch position. In each instance, the aforesaid movable contact members are moved by suitable mechanism as known to those skilled in the art.

Referring to Fig. 3, I have shown, in assembled relation, a part of the hereinbefore described housing 2, the adapter plate 1 and the propeller hub 4. In addition, I have shown the movable contact member $c1$ and the fixed contact member $k1$ previously referred to. The movable contact member $c1$ is secured to a member 25 suitably mounted for sliding or reciprocatory movement with respect to the fixed contact member $k1$, said movable member 25 being actuatable by a movable member 26a connected thereto. The member 26 is disposed within a member 27 fixed to the housing 2. As illustrated, the contact members $c1$ and $k1$ are enclosed by the telescopically arranged sleeves 28 and 29 formed from suitable electricity-insulating material.

In connection with the invention, it will be understood that the construction and arrangement of the sets of contact members $c3$, $k3$ and $c4$, $k4$ is the same as described above as regards the contact members $c1$, $k1$. The battery 16 described above, which operates the high pitch and low pitch circuits, has a voltage of twenty-four volts, for example, whereas the booster motor 14 described above, which operates the feather circuit, has a voltage of ninety-six volts, for example. When any one of the contact members $c1$, $c3$ or $c4$, particularly, the former which is the high voltage circuit, is moved to circuit-opening position, the inductive surge of current usually strikes an arc and this, of course, results in damage to the contact members included in the deenergized circuit.

In accordance with my invention, this undesired arcing effect is entirely or largely prevented by connecting a suitable unilateral device such as a dry disk or other current rectifier across each of the field windings 6 and 11 and also across the motor M together with the brake coil 9. Thus, as shown in Fig. 1, one terminal of a unilateral device such as a suitable rectifier R is connected to the conductor 5 between the junction thereof with the conductor 7 and the field winding 6 while one terminal of another similar rectifier R1 is connected to the conductor 10 between the contact member $c3$ and the field winding 11. The other terminals of these rectifiers are connected together by a conductor 30 which extends across the motor M and the brake winding 9.

As hereinbefore described, the motor M and the field winding 6 are energized from the booster motor 14 over the described circuit when the propeller is to be moved to feather position. When feather position is reached, the limit switch contact member $c1$ is moved automatically from the associated contact member $k1$ to thereby open the feather circuit.

When this happens, the interrupted field current then flows along the alternate path which includes the motor field winding 6, the motor armature, the brake coil 9 and the rectifier R thus tending to maintain the field excitation. The resultant slower decay of current in the field winding 6 produces a smaller inductive surge with consequent less tendency to strike an arc at the contact members $c1$, $k1$. Further, the motor armature counter voltage is maintained longer due to the slower decay of field current as noted above and this counter voltage opposes the voltage tending to strike the described arc. In this manner, the inductive surge is dissipated due to the presence of the rectifier R, the latter, however, during normal operation being ineffective to cause the use of more current.

It will be understood that the action of the rectifier R is the same as described above when the motor M and the field winding 6 are energized from the battery 16 to increase the propeller pitch. Further, it will be understood that the action of the rectifier R1 in the circuit of the field winding 11 and motor M corresponds with that of the rectifier R.

Although I have illustrated and described the rectifiers R and R1 as connected across the field windings, the motor and the brake coil, it will be understood that the invention is not to be thus limited. As desired, said rectifiers R and R1 may be connected across the field windings, the motor and the brake coil separately or jointly as desired. When said rectifiers R and R1 are connected solely across the respective field windings, the flow of field current to be maintained will not be opposed by the desirable counter voltage of the motor armature. This is a desired arrangement.

In accordance with the invention, it is desirable that the connection of the rectifier or rectifiers in circuit relation should not necessitate the use of additional sets of contact members c1, k1, etc. With the forms of the invention herein disclosed, this desirable object is attained and, as will be understood, said rectifier or rectifiers may be carried by the housing 2 or otherwise as may be desirable.

With the circuit herein illustrated, the normal pitch-changing operation occurs automatically as described. Other circuits may be used as desired to effect this operation. Further, for manual control of normal changes in pitch, known circuits may be used in lieu of the one illustrated. With all of these circuits, the arrangement of the invention serves to decrease the arc at the pair of contact members which function as a limit switch. Obviously, said arrangement of the invention also protects any other switch or relay contacts which are included in the circuit.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In combination, means comprising a motor housing and a propeller hub detachably secured to each other, cooperative fixed and movable switch contact members forming a part of said assembly, electrical conductors carried by said housing for connection to a motor and its field winding, conductors carried by said propeller hub for connection to a source of electrical current and a control means, one of said first named conductors terminating in one of said contact members, one of said second named conductors terminating in the other of said contact members, and means for decreasing the arcing effect at said contact members when said movable contact member is separated from said fixed contact member, said last named means comprising a rectifier disposed in parallel relation with respect to said field winding, the terminals of said rectifier being connected to said first named conductors and said rectifier being carried by said housing.

2. In combination, means comprising a motor housing and a propeller hub detachably secured to each other, cooperative fixed and movable switch contact members forming a part of said assembly, electrical conductors carried by said housing for connection to a motor and its field winding, conductors carried by said propeller hub for connection to a source of electrical current and a control means, one of said first named conductors terminating in one of said contact members, one of said second named conductors terminating in the other of said contact members, and an electrical device for decreasing the arcing effect at said contact members when said movable contact member is separated from said fixed contact member, the terminals of said electrical device being connected to said first named conductors.

SIDNEY B. WILLIAMS.